Jan. 29, 1957  M. C. WEST  2,779,128
COIN BANK
Filed May 13, 1954

Maurice C. West
INVENTOR.

BY *Clarence A. O'Brien*
and *Harvey B. Jacobson*
Attorneys

United States Patent Office 2,779,128
Patented Jan. 29, 1957

2,779,128
COIN BANK
Maurice C. West, Chicago, Ill.
Application May 13, 1954, Serial No. 429,474
1 Claim. (Cl. 46—2)

The present invention relates to certain new and useful improvements in money banks, generally speaking, and has more particular reference to a coin bank which is fashioned in imitation of an animal, for example, a pig, a type of children's bank currently known in the trade as a "piggy" bank.

The underlying savings principle which has to do with "fattening" the pig and thus inducing frequent deposits until the pig is fat enough to "go to the market" is, of course, well known. In carrying out the principles of the instant invention, a mildly animated "piggy" bank is offered as a further step to promote the saving of money. That is to say, the instant subject matter has to do with a unique bank which becomes an innovation in this line of endeavor in that it is expressly made and novelly designed to appeal to the users thereof by reason of the fact that it amusingly alters its shape, when partially loaded with coins, wobbles, and when fully loaded, sags and slumps to a position of prolapsus and thus resembles an over-fat pig which is unquestionably ready to go "to the market" for unloading and depositing the coins contained therein.

In carrying out the principles of the invention, I have evolved and produced a bank resembling, as stated, a pig—or similar animal—the same being preferably constructed from an appropriate grade of flexible commercial plastics so shaped and molded that the bank, when empty, is self-standing as any other "piggy" bank would be, but when gradually filled begins to bear down under the strain of weight and pressure imposed by the deposited coins until, when adequately loaded, causes the normally erect or upstanding legs to buckle and bend and become displaced in an amusing manner.

Briefly summarized, the invention has to do with a hollow flexible plastic body molded to represent an animal, a pig, for example, said body having a money or coin slit in the top, the back of the animal, a discharge opening in the bottom, the belly portion, with a removable closure therefor, said belly portion being of deformable squeezeable plastic which assumes a state of collapse when loaded with coins, aggregating a predetermined amount of weight, and legs joined with and depending from said belly portion.

Then, too, novelty is predicated on the structure stated and wherein the legs are normally stable and erect and are such as to render the bank self-standing with the belly portion spaced above a stationary support surface, the inherent erectile properties of said legs being such that when the bank is wholly loaded the legs collapse under the strain, spread apart, whereby said belly portion then slumps to the support surface, tends to flatten out and causes the above adjacent side portions to displace themselves and bulge out, much to the amusement of the observers.

Other objects, features and advantages will become more readily apparent from the following description and the accompanying sheet of illustrative drawings.

In the drawings, wherein like numerals are employed to designate like parts throughout the views.

Figure 1:
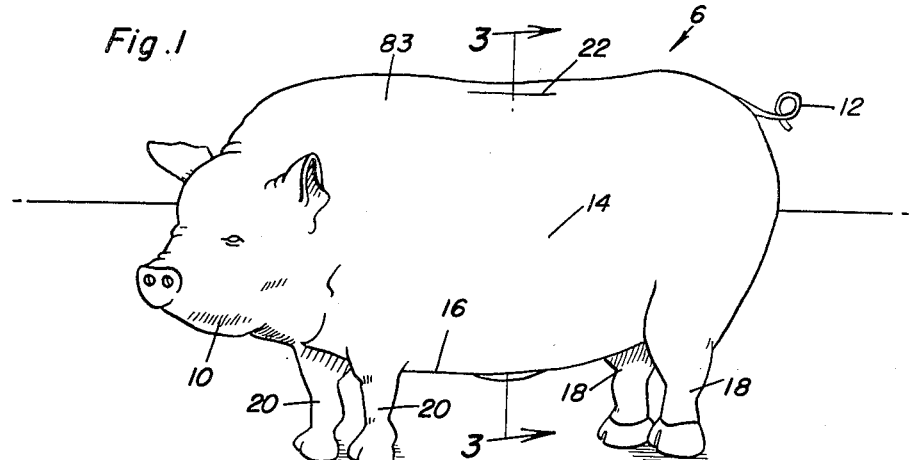
Figure 1 is a perspective view of a "piggy" bank constructed in accordance with the principles of the present invention and showing the same in its normal upstanding or erect state or position.
Figure 2:
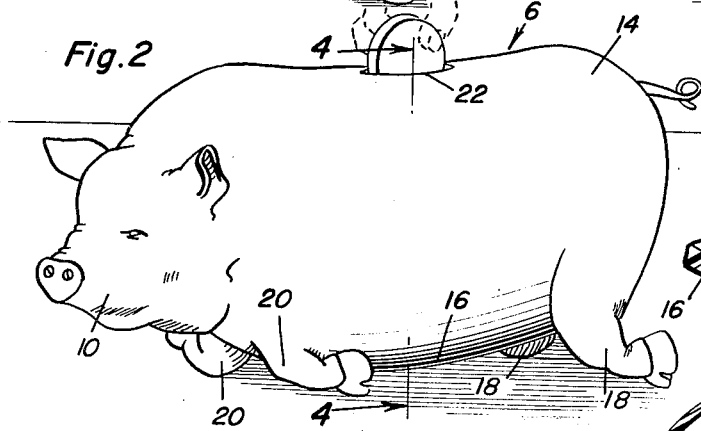
Figure 2 is a perspective view based on Figure 1 and showing the condition and position of the bank when fully loaded and weighted down with a full charge of coins, this being the finally altered prolapsus condition of the aforementioned "over-fat" pig.
Figure 5:
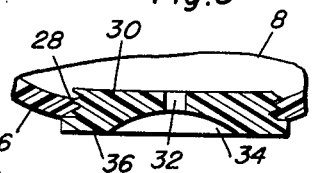
Figure 5 is an exaggerated fragmentary sectional view on the vertical line 5—5 of Figure 3, looking in the direction of the arrows.
Figure 3:
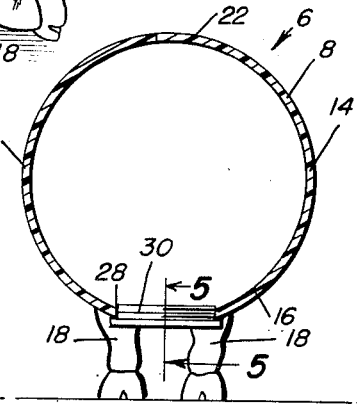
Figure 3 is a cross-section on the vertical line 3—3 of Figure 1, looking in the direction of the arrows.
Figure 4:
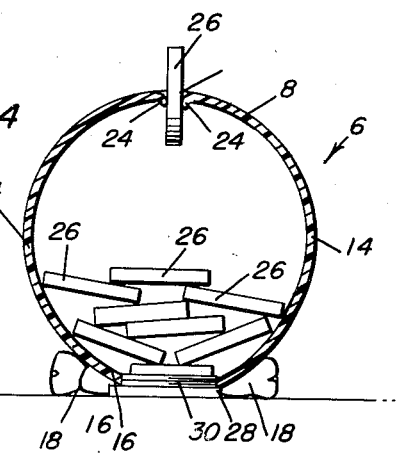
Figure 4 is a similar vertical section on the line 4—4 of Figure 2, looking in the direction of the arrows.

Referring now to the drawings with reference numerals and accompanying lead lines, the bank, as a unit, is denoted by the numeral 6. Although some other animal than that shown may be utilized and properly imitated or represented, the preferred embodiment is that of the representation of a pig, as clear from the preceding description. The bank will be made, preferably, from an appropriate grade of squeezable or flexible material, for example, commercial plastics, the kind employed in making squeezable-type bottles and the like. The special inherent properties and the deformable characteristics will, of course, have to be taken into account and properly handled by the manufacturer. It is the unique idea and construction which is the invention here. In any event, the hollow body is denoted at 8, the head at 10, the tail at 12, the sides at 14, the belly portion at 16, the rear legs at 18—18 and the front legs at 20—20. The coin slit is preferably in the top and this denoted at 22. It is normally closed but the two lengthwise lip portions may forcibly spread apart as shown at 24—24 in Fig. 4 to permit a coin 26 to be inserted, in an obvious manner. The coins on the interior are also denoted by the numerals 26. While paper money may be used, it is of no import in the instant situation. The discharge opening in the belly for removing the coins is denoted at 28 and this is preferably screw-threaded in the manner shown in Fig. 5 to accommodate the screw-threaded portion of the closing plug 30. Some other form of closure may be employed, but the screw type is preferred and it is provided with a vent 32 and with a kerf 34 for screwing the plug in and out with the aid of a coin, the principal bottom surface 36 being flat. This plug is at the center of the belly portion between the front and rear legs, and it has an additional function in that it serves as a temporary base when the bank or "pig" is collapsed in the manner shown in Figs. 2 and 4. This novel arrangement and construction keeps the bank from rolling over. It is to be noted, too, that when the bank is collapsed fully, the sides 14 bulge out to provide the desired over-fat appearance. As before stated, the legs are made in such a way that they are normally stable and erect and they thus render the bank self-standing with the belly portion spaced above the stationary support surface in the manner shown in Figs. 1 and 3. On the other hand, the inherent erectile properties and strength of said legs is such that when the bank is fully loaded the legs collapse and spread apart, whereby said belly portion then slumps to the support surface, flattens out and causes the adjacent side portions to displace themselves and bulge in the manner illustrated.

A bank of the type shown is an obvious novelty in the "piggy bank" line. It might be promoted by various users for advertising and other business-getting purposes. It is simple in construction and inexpensive to make and sell. It is to be attractive for use on a desk in the office or home, in a child's beedroom and elsewhere. It can be made small or large, and usually should be of such size that it may be carried in one's pocket or purse. In practice, it may be colored and otherwise fancifully finished with pig hair (not shown) for greater reality in representation of a pig.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An animated deformable money bank expressly designed to represent a gluttonous four legged animal, a pig for example, comprising a hollow flexibly resilient plastic body molded to represent the stated animal, said body having a coin insertion slot in its top and embodying a deformable belly portion which has a normal given shape by reason of its inherent resilient properties but assumes a state of prolapsus when said body is loaded with coins aggregating a predetermined amount of weight, short legs joined with and depending from said belly portion, the inherent strength and erectile properties of said legs being such that when the bank is empty or substantially so the legs are stable and erect and thus render the bank self-standing in the usual standing attitude of the represented animal with the belly portion spaced above a flat support surface but being susceptible of buckling from pressure and stress imposed thereon as the weight of the progressively inserted coins becomes effective, said belly portion being provided centrally with a marginally screw-threaded coin emptying opening, a screw-threaded plug screwed into and normally closing said opening, the bottom surface being flat and thus adapted to contact and rest upon the said flat support surface to stably support the animal in buckled condition.

References Cited in the file of this patent

UNITED STATES PATENTS

| | | |
|---|---|---|
| 134,308 | Pfeffer | Dec. 24, 1872 |
| 483,258 | Meyer | Sept. 27, 1892 |
| 1,320,421 | Shearer | Nov. 4, 1919 |
| 2,304,415 | Lawson | Dec. 8, 1942 |
| 2,448,807 | Kimball | Sept. 7, 1948 |
| 2,560,657 | Nogle | July 17, 1951 |
| 2,631,407 | Remple | Mar. 17, 1953 |
| 2,636,317 | Candee | Apr. 28, 1953 |